(12) United States Patent
Engle et al.

(10) Patent No.: US 6,649,249 B1
(45) Date of Patent: Nov. 18, 2003

(54) RANDOM MICROEMBOSSED RECEPTOR MEDIA

(75) Inventors: Lori P. Engle, Little Canada, MN (US); Robert T. Fehr, St. Paul, MN (US); Patrick R. Fleming, Lake Elmo, MN (US); Paul D. Graham, Woodbury, MN (US); Douglas A. Huntley, Maplewood, MN (US); Verna J. LeMire, White Bear Lake, MN (US); Jeffrey L. Solomon, Vadnais Heights, MN (US); Todd R. Williams, Lake Elmo, MN (US); Caroline M. Ylitalo, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 136 days.

(21) Appl. No.: 09/583,295

(22) Filed: May 31, 2000

Related U.S. Application Data

(63) Continuation-in-part of application No. 09/324,093, filed on Jun. 1, 1999.

(51) Int. Cl.⁷ .................................................. B32B 3/00
(52) U.S. Cl. ........................ 428/195; 428/205; 428/207; 428/211; 428/212; 428/213; 428/500; 428/321.3
(58) Field of Search ................................ 428/195, 205, 428/207, 213, 500, 211, 212, 321.3

(56) References Cited

U.S. PATENT DOCUMENTS

| | | |
|---|---|---|
| 3,706,276 A | 12/1972 | Hin et al. |
| 3,957,724 A | 5/1976 | Schurb et al. |
| 3,997,702 A | 12/1976 | Schurb et al. |
| 4,025,159 A | 5/1977 | McGrath |
| 4,145,112 A | 3/1979 | Crone et al. |
| 4,313,988 A | 2/1982 | Koshar |
| 4,379,804 A | 4/1983 | Eisele et al. |
| 4,500,631 A | 2/1985 | Sakamoto et al. |
| 4,567,073 A | 1/1986 | Larson et al. |
| 4,576,850 A | 3/1986 | Martens |
| 4,582,885 A | 4/1986 | Barber |
| 4,588,258 A | 5/1986 | Hoopman |
| 4,605,592 A | 8/1986 | Paquette et al. |
| 4,614,667 A | 9/1986 | Larson et al. |
| 4,649,064 A | 3/1987 | Jones |
| 4,751,127 A | 6/1988 | Pinkston et al. |
| 4,861,644 A | 8/1989 | Young et al. |
| 4,903,041 A | 2/1990 | Light |
| 4,904,519 A | 2/1990 | Newman |
| 4,935,307 A | 6/1990 | Iqbal et al. |
| 5,002,825 A | 3/1991 | Mimura et al. |
| 5,023,129 A | 6/1991 | Morganti et al. |
| 5,045,386 A | 9/1991 | Stan et al. |
| 5,084,338 A | 1/1992 | Light |
| 5,110,356 A * | 5/1992 | Shirota et al. ............... 106/22 |
| 5,138,488 A | 8/1992 | Szczech |
| 5,141,790 A | 8/1992 | Calhoun et al. |
| 5,141,797 A | 8/1992 | Wheeler |
| 5,175,030 A | 12/1992 | Lu et al. |

(List continued on next page.)

FOREIGN PATENT DOCUMENTS

| | | | |
|---|---|---|---|
| DE | 2651427 | * 5/1978 | ............ G03G/7/00 |
| DE | 26 51 427 A1 | 5/1978 | |
| EP | 0 544 283 | 6/1993 | |
| EP | 0 570 515 B1 | 11/1993 | |
| EP | 0 832 756 A2 | 4/1998 | |
| GB | 2 165 164 A | 4/1986 | |
| JP | 61 141585 | 6/1986 | |
| JP | 07089217 | 4/1995 | |
| JP | 08002096 | 1/1996 | |
| JP | 90-86034 | 3/1997 | |
| JP | 9127327 A | 5/1997 | |
| JP | 9175004 A | 7/1997 | |
| JP | 11157204 | 9/1999 | |
| WO | WO 92/07723 | 5/1992 | |
| WO | WO 92/07899 | 5/1992 | |
| WO | WO 92/13924 | 8/1992 | |
| WO | WO 96/33839 | 10/1996 | |
| WO | WO 97/17207 | 5/1997 | |
| WO | WO 97/18950 | 5/1997 | |
| WO | WO 97/33758 | 9/1997 | |
| WO | WO 98/29516 | 7/1998 | |
| WO | WO 98/45054 | 10/1998 | |
| WO | WO 98/52746 | 11/1998 | |
| WO | WO 99/03685 | 1/1999 | |
| WO | WO 99/07558 | 2/1999 | |
| WO | WO 99/17630 | 4/1999 | |
| WO | WO 99/55537 | 11/1999 | |
| WO | WO 99/65999 | 12/1999 | |

OTHER PUBLICATIONS

Merriam–Webster's Collegiate Dictionary, 10$^{th}$ edition, p966–967, No Date.*

"DNA Chips Come of Age"—Chem. & Eng. News pp. 42–43 Dec. 9, 1996.

Lemmo et al., "Characterization of an Inkjet Chemical Microdispenser for Combinatorial Library Synthesis", Anal. Chem. 1997, vol. 69, No. 4, Feb. 15, 1997, pp. 543–551.

Laser Focus World "Manufacturers Turn Precision Optics With Diamond", E. Ray McClure, Feb. 1991, pp 95–105.

*Primary Examiner*—Deborah Jones
*Assistant Examiner*—Ling Xu
(74) *Attorney, Agent, or Firm*—Scott R. Pribnow

(57) ABSTRACT

A receptor medium with a sheet having a random microembossed imaging surface as one major surface thereof. The receptor medium can receive jettable materials, which include inks, adhesives, biological fluids, chemical assay reagents, particulate dispersions, waxes, electrically, thermally, or magnetically modifiable materials, and combinations thereof. The random microembossed medium unexpectedly solves such common inkjet printing problems as feathering, banding, and mudcracking in inkjet printing systems by controlling how an inkjet drop contacts and dries on an inkjet receptor medium and also Moire' effects. Clear lines of demarcation between adjoining colors of a pigmented inkjet image graphic can be obtained without creation of the Moire' effects. Methods of making and using the inkjet receptor medium are also disclosed.

16 Claims, 6 Drawing Sheets

U.S. PATENT DOCUMENTS

| | | |
|---|---|---|
| 5,183,597 A | 2/1993 | Lu |
| 5,192,548 A | 3/1993 | Valasquez et al. |
| 5,202,190 A | 4/1993 | Kantner et al. |
| 5,208,092 A | 5/1993 | Iqbal |
| 5,212,008 A | 5/1993 | Malhotra et al. |
| 5,213,873 A | 5/1993 | Yasuda et al. |
| 5,219,462 A | 6/1993 | Bruxvoort et al. |
| 5,229,207 A | 7/1993 | Paquette et al. |
| 5,271,765 A | 12/1993 | Ma |
| 5,290,615 A | 3/1994 | Tushaus et al. |
| 5,302,437 A | 4/1994 | Idei et al. |
| 5,304,223 A | 4/1994 | Pieper |
| 5,342,688 A | 8/1994 | Kitchin et al. |
| 5,344,681 A | 9/1994 | Calhoun et al. |
| 5,354,813 A | 10/1994 | Farooq et al. |
| 5,378,638 A | 1/1995 | Deeg et al. |
| 5,437,754 A | 8/1995 | Calhoun |
| 5,449,540 A | 9/1995 | Calhoun et al. |
| 5,450,235 A | 9/1995 | Smith et al. |
| 5,534,386 A | 7/1996 | Petersen et al. |
| 5,589,269 A | 12/1996 | Ali et al. |
| 5,601,928 A | 2/1997 | Katayama et al. |
| 5,605,750 A | 2/1997 | Romano et al. |
| 5,647,935 A | 7/1997 | Hoshino et al. |
| 5,658,802 A | 8/1997 | Hayes |
| 5,712,027 A | 1/1998 | Ali et al. |
| 5,747,148 A | 5/1998 | Warner et al. |
| 5,753,350 A | 5/1998 | Bright |
| 5,756,183 A | 5/1998 | Kutsch et al. |
| 5,965,243 A | 10/1999 | Butler et al. |
| 5,989,685 A | 11/1999 | Hockaday |
| 6,113,679 A * | 9/2000 | Adkins et al. ............. 106/31.6 |

* cited by examiner

RANDOM MICROEMBOSSED RECEPTOR MEDIA

CROSS REFERENCE TO RELATED APPLICATION

This application is a Continuation-In-Part of U.S. patent application Ser. No. 09/324,093, filed Jun. 1, 1999, which is incorporated herein by reference.

FIELD OF INVENTION

This application relates to inkjet printing media to improve drying times of the inkjet ink, improve abrasion resistance of the inkjet image after drying, and prevent visual defects caused by ink beading, ink spreading, or mudcracking, resulting in improved print quality.

BACKGROUND OF INVENTION

Image graphics are omnipresent in modern life. Images and data that warn, educate, entertain, advertise, etc. are applied on a variety of interior and exterior, vertical and horizontal surfaces. Nonlimiting examples of image graphics range from advertisements on walls or sides of trucks, to posters that advertise the arrival of a new movie, warning signs near the edges of stairways, and the like.

The use of thermal and piezo inkjet inks has greatly increased in recent years with accelerated development of inexpensive and efficient inkjet printers, ink delivery systems, and the like.

Thermal inkjet hardware is commercially available from a number of multinational companies, including without limitation, Hewlett-Packard Corporation of Palo Alto, Calif.; Encad Corporation of San Diego, Calif.; Xerox Corporation of Rochester, N.Y.; ColorSpan Corporation of Eden Prairie, Minn.; and Mimaki Engineering Co., Ltd. of Tokyo, Japan. The number and variety of printers change rapidly as printer makers are constantly improving their products for consumers. Printers are made both in desk-top size and wide format size depending on the size of the finished image graphic desired. Nonlimiting examples of popular commercial scale thermal inkjet printers are Encad Corporation's NOVAJET PRO printers and Hewlett-Packard's 650C, 750C, and 2500CP printers. Nonlimiting examples of popular wide format thermal inkjet printers include Hewlett-Packard Corporation's DesignJet printers, where the 2500CP is preferred because it has 600×600 dots/inch (dpi) resolution with a drop size in the vicinity of about 20 picoliters (pL).

Minnesota Mining and Manufacturing Company (3M) of St. Paul, Minn. markets GRAPHIC MAKER INKJET software useful in converting digital images from the Internet, ClipArt, or Digital Camera sources into signals to thermal inkjet printers to print such image graphics.

Inkjet inks are also commercially available from a number of multinational companies, particularly Minnesota Mining and Manufacturing Company which markets its Series 8551; 8552; 8553; and 8554 pigmented inkjet inks. The use of four process colors: cyan, magenta, yellow, and black (generally abbreviated "CMYK") permit the formation of as many as 256 colors or more in the digital image.

Media for inkjet printers are also undergoing accelerated development. Because inkjet imaging techniques have become vastly popular in commercial and consumer applications, the ability to use a personal computer to print a color image on paper or other receptor media has extended from dye-based inks to pigment-based inks. The media must accommodate that change. Pigment-based inks provide more durable images because of the large size of colorant as compared to dye molecules.

Inkjet printers have come into general use for wide-format electronic printing for applications such as engineering and architectural drawings. Because of the simplicity of operation and economy of inkjet printers, this image process holds a superior growth potential promise for the printing industry to produce wide format, image on demand, presentation quality graphics.

Therefore, the components of an inkjet system used for making graphics can be grouped into three major categories:

1. Computer; software, printer
2. Ink
3. Receptor medium

The computer, software, and printer will control the size, number and placement of the ink drops and will transport the receptor medium through the printer. The ink will contain the colorant which forms the image and carrier for that colorant. The receptor medium provides the repository which accepts and holds the ink. The quality of the inkjet image is a function of the total system. However, the compositions and interaction between the ink and receptor medium are most important in an inkjet system.

Image quality is what the viewing public and paying customers will want and demand to see. From the producer of the image graphic, many other obscure demands are also placed on the inkjet media/ink system from the print shop. Also, exposure to the environment can place additional demands on the media and ink (depending on the application of the graphic).

Current inkjet receptor media, direct coated with compositions according to the disclosure-contained in U.S. Pat. No. 5,747,148 (Warner et al.) and in PCT Patent Publication Nos, WO 99/07558 (Warner et al.) and WO 99/03685 (Waller et al.), are marketed by Minnesota Mining and Manufacturing Company under the brands 3M™ Scotchcal™ Opaque Imaging Media 3657-10 and 3M™ Scotchcal™ Translucent Imaging Media 3637-20, 8522, and 8544, respectively. Another inkjet receptor media is disclosed in PCT Patent Publication No. WO 97/33758 (Steelman et al.) which combines a hygroscopic layer on a hydrophilic microporous media.

Inkjet inks are typically wholly or partially water-based, such as disclosed in U.S. Pat. No. 5,271,765. Typical receptors for these inks are plain papers or preferably specialty inkjet receptive papers which are treated or coated to improve their receptor properties or the quality of the images resulting therefrom, such as disclosed in U.S. Pat. No. 5,213,873.

Many inkjet receptor compositions suitable for coating onto plastics to make them inkjet receptive have been disclosed. Typically these receptor layers are composed of mixtures of water-soluble polymers which can absorb the aqueous mixture which the inkjet ink comprises. Very common are hydrophilic layers comprising poly(vinyl pyrrolidone) or poly(vinyl alcohol), as exemplified by U.S. Pat. Nos. 4,379,804; 4,903,041; and 4,904,519. Also known are methods of crosslinking hydrophilic polymers in the receptor layers as disclosed in U.S. Pat. Nos. 4,649,064; 5,141,797; 5,023,129; 5,208,092; and 5,212,008. Other coating compositions contain water-absorbing particulates such as inorganic oxides, as disclosed in U.S. Pat. Nos. 5,084,338; 5,023,129; and 5,002,825. Similar properties are found for inkjet paper receptor coatings, which also contain particulates, such as cornstarch as disclosed in U.S. Pat. Nos. 4,935,307 and 5,302,437.

The disadvantage that many of these types of inkjet receptor media suffer for image graphics is that they comprise water-sensitive polymer layers. Even if subsequently overlaminated, they still contain a water-soluble or water-swellable layer. This water-sensitive layer can be subject over time to extraction with water and can lead to damage of the graphic and liftoff of the overlaminate. Additionally, some of the common constituents of these hydrophilic coatings contain water-soluble polymers not ideally suitable to the heat and UV exposures experienced in exterior environments, thus limiting their exterior durability. Finally, the drying rate after printing of these materials appears slow since until dry, the coating is plasticized or even partially dissolved by the ink solvents (mainly water) so that the image can be easily damaged and can be tacky before it is dry.

In recent years, increasing interest has been shown in microporous films as inkjet receptors to address some or all of the above disadvantages. Both Warner et al. and Waller et al. publications and Steelman et al. application identified above disclose microporous films to advantage. If the film is absorbent to the ink, after printing the ink absorbs into the film itself into the pores by capillary action and feels dry very quickly because the ink is away from the surface of the printed graphic. The film need not necessarily contain water-soluble or water-swellable polymers, so potentially could be heat and UV resistant and need not be subject to water damage.

Porous films are not necessarily receptive to water-based inkjet if the material is inherently hydrophobic and methods of making them hydrophilic have been exemplified for example by PCT Patent Publication No. WO 92/07899.

Other films are inherently aqueous ink absorptive because of the film material, e.g., Teslin™ (a silica-filled polyolefin microporous film) available from PPG Industries and of the type exemplified in U.S. Pat. No. 4,861,644. Possible issues with this type of material are that if used with dye based inks image density can be low depending on how much of the colorant remains inside the pores after drying. One way of avoiding this is to fuse the film following printing as exemplified in PCT Patent Publication No. WO 92/07899.

Other methods are to coat the microporous film with a receptor layer as disclosed in PCT Patent Publication No. WO 97/33758 (Steelman et al.) and U.S. Pat. No. 5,605,750.

U.S. Pat. No. 5,605,750 exemplifies a pseudo-boehmite coating applied to the silica-filled microporous film such as Teslin™. The coating contains alumina particles of pseudo-boehmite of pore radius 10 to 80 Å. Also disclosed is an additional protective layer of hydroxypropylmethyl cellulose.

Several problems exist using receptor coatings mentioned above. The rate of ink absorption is, at most, 8–10 ml/sec/m$^2$ for swellable coatings; this is slow when compared to the rate of ink drop application. Secondly, the volumes of ink applied by many popular wide format inkjet printers at 140 pL/drop (HP2500: 20 pL /drop but 160 pL/dot) can create problems such as "feathering", "demixing", and coalescence of the ink.

As stated above, the relationship between the ink and the media is key to image graphic quality. With printers now reaching 1400×720 dpi precision, inkjet drop size is smaller than in the past. As stated previously, a typical drop size for this dpi precision is about 20 picoliters, which is a fraction of the size of prior drop sizes of 140 picoliters used in wide format inkjet printers, most notably and commonly Encad™ NOVAJET III, IV, and Pro models. Some printer makers are striving for even smaller drop sizes, while other printer makers are content with the larger drop sizes for large format graphics. With pigmented inkjet inks, drop size determines the quantity of pigment particles that reside in each drop and are to be directed to a predetermined area of media.

When the inkjet ink drop contacts the receptor medium, a combination of two things occurs. The inkjet drop diffuses vertically into the medium and diffuses horizontally along the receptor surface, with a resulting spread of the dot.

However, with pigment-based inkjet inks of the right particle size and if used with a film of the right pore-size, some filtration of the colorant is possible at the surface of the film resulting in a good density and color saturation. However, images can still be very poor if dot gain is low due to "banding phenomena" where insufficient ink remains to generate the appropriate halftone image. If dot size is too small, then errors due to media advancement or failed printhead nozzles can cause banding. This problem would not be seen with larger drop size printers because larger dots could cover up prior printing errors. However, if dots are too large, then edge acuity is lost. Edge acuity is a reason for increased dpi image precision. Ability to control dot diameter is therefore an important property in an inkjet receptor medium.

Finally, the use of pigmented inks has raised additional issues in print quality, most notably "mudcracking". Mudcracking is the term used to describe the observation that swellable receptor coatings take up pigments by filtration of the particles at the surface and swelling-to accommodate the carrier solvents, followed by drying, when the pigment particle film cracks as swelling goes down. The image appears as fragmented as a dried lake bed, with its mud cracked.

SUMMARY OF INVENTION

This invention has utility for the production of image graphics using inkjet printers. This invention unexpectedly solves such common inkjet printing problems as feathering, banding, and mudcracking in inkjet printing systems by controlling how an inkjet drop contacts and dries on an inkjet receptor medium.

Coassigned, PCT Patent Publication No. WO 99/55537 (Ylitalo et al.) discloses the use of regular microembossed surface patterns as one solution to the problems in the art.

Regular, engineered microembossed surface patterns could have a number of potential disadvantages as well. One could be the existence of Moire' patterns, particularly in raster printing operations where a scanning head traverses the microembossed sheet to dispense ink droplets at regular intervals. Another could be the time and expense involved with using the high precision machines needed to produce the master patterns.

One aspect of the present invention is the use of some random microembossed surfaces which can give good to excellent results with desktop and large format inkjet printing of image graphics. Further, the use of these random surface patterns can give some advantages over the prior art, including lack of Moire' effects, higher tolerance of cosmetic defects, and potentially lower costs of tool generation.

One aspect of the invention is a receptor medium comprising a sheet having a random microembossed surface topography as one major surface thereof, wherein the sheet is nonporous. The microembossed surface topography comprises microembossed elements that are cavities or posts. Preferably, when the elements are cavities, each cavity of the receptor medium has a microembossed capacity of at least about 10 pL. Preferably, if the microembossed elements are posts, the space between posts is from about 10 to about 500 micrometers, the posts have a height of from about 10 to about 100 micrometers, and diameters of not more than 100 micrometers and not less than 5 micrometers.

"Microembossed capacity" means that the imaging surface is capable of receiving at least two colors of inkjet ink within or about each microembossed element on the, imaging surface.

"Random" means one or more features of the microembossed elements are intentionally and/or systematically varied in a non-regular manner. Examples of features that are intentionally and/or systematically varied in a non-regular manner are pitch, peak-to-valley distance, depth, height, wall angle, post diameter, edge radius, and the like.

"Microembossed element" means a recognizable geometric shape that either protrudes or is depressed.

"Combination" patterns may for example comprise patterns that are random over an area having a minimum radius of ten element widths from any point, but these random patterns can be reproduced over larger distances within the overall pattern.

"Inverse pattern" means the resulting pattern produced from a sheet or solidifying liquid material contacts and conforms to a mold.

"Nonporous" means that the unembossed sheet is not substantially porous to liquids nor does it have a reticulated outer surface before the imaging surface is microembossed.

A "microembossed" surface has a topography wherein the average microembossed element pitch; that is, center to center distance between nearest elements is from about 1 to about 1000 micrometers and the average peak to valley distances of individual elements is from about 1 to about 100 micrometers.

"Microembossing" means embossing a surface and making it a microembossed surface, or causing a microembossed surface to be formed from a liquid which is solidified during the microembossing process.

Preferably, the receptor medium is an inkjet receptor medium.

More preferably, the microembossed imaging surface comprises cavities enclosed by walls, packed closely together, and with cavity volume commensurate with at least 100 percent ink from the targeted printer.

Another aspect of the present invention is an imaged inkjet receptor medium comprising a sheet having microembossed image surface and particles of pigment or dye dried on the microembossed image surface.

Another aspect of the invention is a method of making an inkjet receptor medium, comprising the steps of: (a) selecting a microembossing mold with a molding surface having a microembossed, but random, topography; and (b) contacting the molding surface of the mold against a polymeric sheet to form a random microembossed surface topography on the sheet wherein said topography is the inverse of,the molding surface. Preferably, heat and pressure are used during the contacting step to form the microembossed surface.

Another aspect of the invention is a method of making an inkjet receptor medium, comprising the steps of: (a) selecting a microembossing mold with a molding surface having a microembossed, random topography; and (b) extruding a polymer over the molding surface of the mold to form a polymeric sheet having a random microembossed surface topography which is the inverse of the molding surface.

Another aspect of the invention is a method of making an inkjet receptor medium comprising the steps of: (a) selecting a microembossing mold with a molding surface having a microembossed, random topography; (b) contacting a fluid with the molding surface; and (c) solidifying the fluid to form a sheet having a random microembossed surface topography which is the inverse of the molding surface. Preferably, the fluid is a radiation-curable fluid and the fluid is solidified by exposing the fluid to UV, visible or electron beam radiation.

Another feature of the invention is the ability to microemboss an inkjet receptor medium with a random collection of microembossed surfaces.

An advantage of the invention is the minimization of common inkjet printing problems, such as banding, feathering, bleeding, and mudcracking, by altering the receiving surface of the inkjet receptor medium rather than altering the formulation of the inkjet inks.

Another advantage of the invention is the ease by which a microembossed image surface can be formed.

Another advantage of the present invention is the protection of the inkjet image from abrasion at the surface of the inkjet receptor medium because the colored entities forming the image reside within or around elements of the topography of the microembossed image surface. As such, the medium of the present invention provides abrasion resistance, smear resistance, and prevention of feathering or bleeding of the image.

Another advantage of the invention is the usefulness of the microembossed image surface with organic solvent-based, water-based, phase change, or radiation polymerizable inks. The inks can further comprise either dye or pigment based colorants.

The use of random surface patterns of the present invention can also give some advantages over engineered, reproducible, patterns, including lack of Moire' effect, higher tolerance of cosmetic defects, and potentially lower costs of tool generation.

The embodiments of the invention that follow will identify these and other features and advantages.

EMBODIMENTS OF INVENTION

Microembossed Image Surface

Figure 1A:
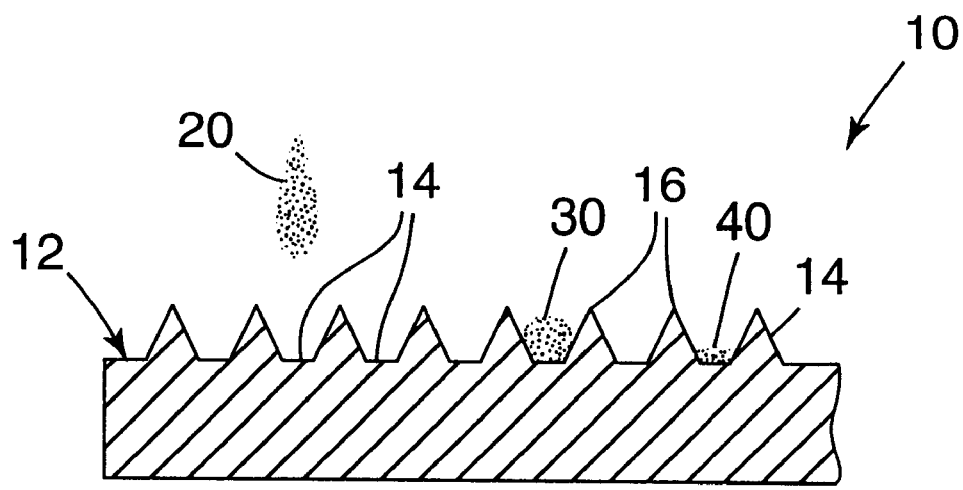
FIGS. 1a and 1b are an illustrative cross-sectional view of an envisioned sequence of inkjet drop deposition, drying, and final appearance using random cavities.

FIG. 1a illustrates the premise of the present invention: an inkjet receptor medium 10 that can be constructed to have a microembossed image surface 12 of multiple random cavities or wells 14 for receiving and protecting pigment particles contained in an inkjet ink and multiple peaks 16.

At the left side of FIG. 1a, one sees an inkjet drop 20, typically ranging in size from about 10 to about 150, and preferably from about 20 to about 140 pL, approaching microembossed image surface 12.

In the middle of FIG. 1a, one sees an inkjet drop 30 within one cavity 14 as drop 30 begins to dry cure, or otherwise coalesce, depending on the nature of the inkjet ink formulation.

On the right of FIG. 1a, one sees an inkjet drop 40 that has dried and residing within a cavity 14 such that it is protected from abrasion from items contacting the multiplicity of peaks 16 that, on a macroscopic level, constitute the outermost surface of medium 10.

Figure 1B:
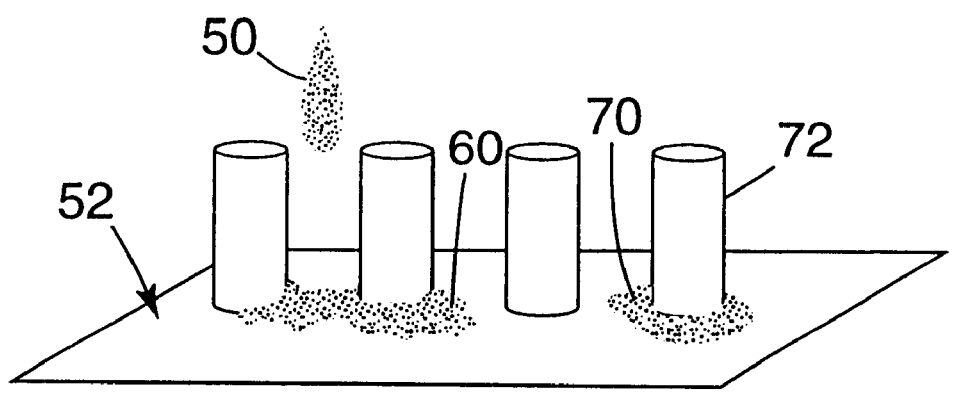

FIG. 1b shows a post pattern embodiment of the present invention 50 At the left side of FIG. 1b, one sees an inkjet drop 60, typically ranging in size from about 10 to about 150, and preferably from about 20 to about 140 pL, approaching embossed image surface 52.

In the middle of FIG. 1b, one sees ink 70 on such surface 52 as ink 70 begins to dry, cure, or otherwise coalesce, depending on the nature of the inkjet ink formulation.

On the right of FIG. 1b, one sees ink 80 that has dried about a post 54 such that it is protected from abrasion from items contacting the multiplicity of posts 54 that, on a macroscopic level, constitute the outermost surface of medium 50.

FIG. 1a also illustrates an important consideration of the invention: more than one drop of ink can reside in a single cavity, because mixing of the colors: cyan, yellow, and magenta are needed to create the infinite number of colors now demanded in inkjet printing. Thus, one could size the volume of cavities to anticipate the placement of as many as three drops of different colors in order to satisfy multi-color printing. The volume of a cavity should preferably be at least 10, and more preferably at least 30 pL. The volume of a cavity can range from about 20 to about 1,000, and preferably from about 60 to about 600 pL.

The designed volume of the cavities depends on the desired shape of the cavities and the printed ink drop volume. While the illustration of FIG. 1a shows curvilinear slopes to the bottom of a cavity 14 between adjacent peaks 16, a variety of embossing geometries can be chosen within the scope of the invention.

Nonlimiting examples of topographies for cavities 14 range from the extreme of cubic cavities with parallel vertical, planar walls to the extreme of hemispherical cavities, with any possible solid geometrical configuration of walls in between those extremes. Preferred examples of topographies for cavities 14 include conical cavities with angular, planar walls; truncated pyramid cavities with angular, planar walls; and cube-corner shaped cavities.

One acceptable way of characterizing the cavity structure is to identify aspect ratios for such cavities. "Aspect ratio" means the ratio of depth to width of the cavity. The aspect ratio of cavities 14 can range from about 0.05 to about 2, and preferably from about 0.1 to about 1.

The overall depth of cavities 14 depends on the shape of the cavity, aspect ratio, and the desired volume for the cavity, described above. For a cubic-shaped cavity, the depth ranges from about 25 to about 75 $\mu$m. For a hemispherical-shaped cavity, the depth ranges from about 35 to about 70 $\mu$m. The depth of another geometrically-shaped cavity resides in between these extremes for a given volume.

For example, a cube having 75 $\mu$m sides and depth, 5 $\mu$m walls, with an aspect ratio of 1, giving a void volume of 420 pL capable of holding three drops of ink from a Hewlett-Packard 51626 print cartridge.

Preferably, the embossed imaging surface comprises cavities enclosed by walls and packed closely together such that: (1) thickness of the wall tops is 10 $\mu$m or less; (2) cavity volume is commensurate with 100 to 300 percent ink from the targeted printer; and (3) the number of cavities per inch is equal to or greater than the number of dots per inch (dpi) of the targeted printer. Additionally, if transparency of the substrate is desired, the walls should have as close to 0 degree tilt from normal to the surface of the substrate as is possible.

The microembossed elements may cover the entire surface of the sheet material or may cover only portions of the surface of the sheet material. The microembossed elements preferably cover the area of the sheet wherever ink or other substances are desired to be placed. For example, the microembossed elements may cover an area to form a desired pattern such as a word, letters, or numbers or any combination thereof.

Polymeric Film

The polymeric sheet used in the inkjet medium can be made from any polymer capable of being microembossed in the manner of the present invention. The sheet can be a solid film. The sheet can be transparent, translucent, or opaque, depending on desired usage. The sheet can be clear or tinted, depending on desired usage. The sheet can be optically transmissive, optically reflective, or optically retroreflective, depending on desired usage.

Nonlimiting examples of polymeric films include thermoplastics, such as polyolefins, poly(vinyl chloride), copolymers of ethylene with vinyl acetate or vinyl alcohol, polycarbonate, norbornene copolymers, fluorinated thermoplastics such as copolymers and terpolymers of hexafluoropropylene and surface modified versions thereof, poly (ethylene terephthalate), and copolymers thereof, polyurethanes, polyimides, acrylics, plasticized polyvinyl alcohols, blends of polyvinylpyrrolidone and ethylene acrylic acid copolymer (Primacor™, The Dow Chemical Company) and filled versions of the above using fillers such as silicates, aluminates, feldspar, talc, calcium carbonate, titanium dioxide, and the like. Also useful in the application are non-wovens, coextruded films, and laminated films made from the materials listed above.

More specifically, polyolefins can be ethylene homopolymers or copolymers, such as 7C50 brand ethylene propylene copolymer commercially available from Union Carbide Co. of Houston, Tex. Other specifically useful films include LEXAN polycarbonate from General Electric Plastics of Pittsfield, Mass., ZEONEX polymer from B. F. Goodrich of Richfield, Ohio, THV-500 polymer from Dyneon LLC of Oakdale, Minn., plasticized poly(vinyl chloride), poly (ethylene terephthalate) copolymer, EASTAR 6763, from Eastman, AFFINITY PL 1845 from Dow Chemical Company, plasticized polyvinyl alcohols, ECOMATY AX 50 and AX 2000, from Nippon Gohsei, and SURLYN acrylic acid copolymers from DuPont DeNemours and Co. of Wilmington, Del.

Properties of polymeric sheets of the present invention can be augmented with outer coatings that improve control of the ink receptivity of the microembossed image surface 12 of the ink receptor medium 10. As stated in the Background of the Invention above, any number of coatings are known to those skilled in the art. It is possible to employ any of these coatings in combination with the microembossed image surface of the present invention. These coatings are typically applied after the microembossed image surface has been created.

Preferably, one can employ a fluid management system as disclosed in PCT Patent Publication No. WO 99/03685 and its copending, coassigned U.S. pat. application Ser. No. 08/892,902 (Waller et al.), the disclosure of which is incorporated herein by reference. Briefly, a variety of surfactants or polymers can be chosen to provide particularly suitable surfaces for the particular fluid components of the pigmented inkjet inks. Surfactants can be cationic, anionic, nonionic, or zwitterionic. Many of each type of surfactant are widely available to one skilled in the art. Accordingly, any surfactant or combination of surfactants or polymer(s) that will render said substrate hydrophilic could be employed.

These surfactants can be imbibed into recessed surfaces of the microembossed substrate. Various types of surfactants have been used in the coating systems. These may include but are not limited to fluorochemical, silicone, and hydrocarbon-based ones wherein the said surfactants may be cationic, anionic, or nonionic.

Various types of non-ionic surfactants can be used, including but not limited to: Dupont's ZONYL fluorocarbons (for example, ZONYL FSO); BASF's (PLURONIC) block copolymers of ethylene and propylene oxide to an ethylene glycol base; ICI's (TWEEN) polyoxyethylene sorbitan fatty acid esters; Rohm and Haas's (TRITON X series) octylphenoxy polyethoxy ethanol; Air Products and Chemicals, Inc. (SURFYNOL) tetramethyl decynediol; and Union Carbide's SLWET L-7614 and L-7607 silicone surfactants, and the like known to those skilled in the art.

Various types of hydrocarbon-based anionic surfactants can also be used, including but not limited to: American Cyanamid's (AEROSOL OT) surfactants like dioctylsulfosuccinate-Na-salt or dialkylsulfosuccinate-Na-salt.

Various types of cationic surfactants can also be used, including but not limited to: benzalkonium chloride, a typical quaternary ammonium salt.

Other coating materials may be used which are intended to improve the appearance or durability of the microembossed and printed substrate. Many examples of inkjet receptor coatings can be found in the patent literature; for example, boehmite alumina based coatings, silica based coatings, and the like should not be considered outside the scope of the invention. If the targeted printer prints aqueous dye inks, then a suitable mordant may be coated onto the microembossed surface in order to demobilize or "fix" the dyes. Mordants which may be used generally consist of, but are not limited to, those found in patents such as U.S. Pat. Nos. 4,500,631; 5,342,688; 5,354,813; 5,589,269; and 5,712,027. Various blends of these materials with other coating materials listed herein are also within the scope of the invention.

Additionally, directly affecting the substrate by means generally known in the art may be employed in the context of this invention. For example, polypropylene could be corona treated before or after microembossing, or poly(vinyl chloride) could be surface dehydrochlorinated before or after microembossing, and either of these films could be used as a printable substrate.

Optional Adhesive Layer and Optional Release Liner

The receptor medium 10 optionally has an adhesive layer on the major surface of the sheet opposite microembossed image surface 12 that is also optionally but preferably protected by a release liner. After imaging, the receptor medium 10 can be adhered to a horizontal or vertical, interior or exterior surface to warn, educate, entertain, advertise, etc.

The choice of adhesive and release liner depends on usage desired for the image graphic.

Pressure-sensitive adhesives can be any conventional pressure-sensitive adhesive that adheres to both the polymer sheet and to the surface of the item upon which the inkjet receptor medium having the permanent, precise image is destined to be placed. Pressure-sensitive adhesives are generally described in Satas, Ed., *Handbook of Pressure Sensitive Adhesives*, 2nd Ed. (Von Nostrand Reinhold 1989), the disclosure of which is incorporated herein by reference. Pressure-sensitive adhesives are commercially available from a number of sources. Particularly preferred are acrylate pressure-sensitive adhesives commercially available from Minnesota Mining and Manufacturing Company and generally described in U.S. Pat. Nos. 5,141,790; 4,605,592; 5,045,386; and 5,229,207; and EPO Patent Publication No. EP 0 570 515 B1 (Steelman et al.).

Release liners are also well known and commercially available from a number of sources. Nonlimiting examples of release liners include silicone coated kraft paper, silicone coated polyethylene coated paper, silicone coated or non-coated polymeric materials such as polyethylene or polypropylene, as well as the aforementioned base materials coated with polymeric release agents such as silicone urea, urethanes, and long chain alkyl acrylates, such as defined in U.S. Pat. Nos. 3,957,724; 4,567,073; 4,313,988; 3,997,702; 4,614,667; 5,202,190; and 5,290,615; the disclosures of which are incorporated herein by reference and those liners commercially available as Polyslik brand liners from Rexam Release of Oakbrook, Ill., and EXHERE brand liners from P.H. Glatfelter Company of Spring Grove, Pa.

Method of Forming Microembossed Image Surface

The microembossed image surface can be made from any contacting technique such as casting, coating, or compressing techniques. More particularly, microembossing can be achieved by at least any of: (1) casting a molten thermoplastic using a tool having a microembossed random pattern; (2) coating of a fluid onto a tool having that microembossed random pattern, solidifying the fluid, and removing the resulting microembossed solid; or (3) passing a thermoplastic film through a roll nip to compress against a tool having that microembossed random pattern.

Desired microembossing topography can be formed in tools via any of a number of techniques well known to those skilled in the art, selected depending in part upon the tool material and features of the desired topography. Illustrative techniques include etching (for example, via chemical etching, mechanical etching, or other ablative means such as laser ablation or reactive ion etching, etc.), photolithography, stereolithography, micromachining, knurling (for example, cutting knurling or acid enhanced knurling), scoring or cutting, etc. Among the patents that disclose these various techniques include U.S. Pat. No. 5,183,597 (Lu); U.S. Pat. No. 4,588,258 (Hoopman); and U.S. Pat. No. 5,175,030 (Lu et al.).

A preferred embossing tooling can be made by casting a two part curable silicone material over a master mold which has the same random pattern as desired for the microembossed image surface 12 of the inkjet receptor medium 10. The silicone mold therefore has the inverse image (cavity-forming geometry protruding). This mold can then be used in a hot press or in actual extrusion or casting operations.. Extrusion embossing is accomplished by passing the mold through the nip to make microembossed sections on the extruded film. Another preferred tool for extrusion embossing is a metal casting roll which itself carries the inverse of the pattern which is to be microembossed on the thermoplastic sheet.

Compressing Method

This method uses a hot press familiar to those skilled in the art of compression molding.

The pressure exerted in the press typically ranges from about $4.1 \times 10^4$ to about $1.38 \times 10^5$ kPa, and preferably from about $6.9 \times 10^4$ to about $1.0 \times 10^5$ kPa.

The temperature of the press at the mold surface typically ranges from about 100° C. to about 200° C., and preferably from about 110° C. to about 150° C.

The dwell time of pressure and temperature in the press typically ranges from about 1 to about 5 minutes. The pressure, temperature and dwell time used depend primarily on the particular material being microembossed, as is well known to those skilled in the art. The process conditions should be sufficient to cause the material to flow and faithfully take the shape of the surface of the tool being used. Any generally available commercial hot press may be used, such as Wabash Model 20-122TM2WCB press from Wabash MPI of Wabash, Ind.

Extrusion Method

A typical extrusion process for the present invention involves passing an extruded substrate through a nip created by a chilled roll and a casting roll having a surface having a random pattern inverse of desired microembossed image surface, with the two rolls rotating in opposite directions. A flexible sheet or belt comprising the tool may also be used and put through the nip simultaneously with the melt.

Single screw or twin screw extruders can be used. Conditions are chosen to meet the general requirements which are understood to the skilled artisan. Representative but non-limiting conditions are outlined below.

The temperature profile in the extruder can range from 100° C. to 250° C. depending on the melt characteristics of the resin.

The temperature at the die ranges from 150° C. to 230° C. depending on the melt strength of the resin.

The force exerted in the nip can range from about 6 to about 150 kN/m, and preferably from about 10 to about 100 kN/m.

The temperature of the nip roll can range from about 5° C. to about 150° C. and, preferably from about 10° C. to about 100° C., and the temperature of the cast roll can range from about 25° C. to about 100° C., and preferably about 40° C. to about 60° C.

The speed of movement through the nip typically ranges from about 0.25 to about 10 m/min, and preferably as fast as conditions allow.

Nonlimiting examples of equipment useful for this extrusion method include single screw extruders such as a 1¼ inch Killion (Killion Extruders, Inc. of Cedar Grove, N.J.) equipped with a gear pump such as a Zenith gear pump to control flow rate, co-rotating twin screw extruders such as a 25 mm Berstorff (Berstorff Corporation of Charlotte, N.C.) and counter-rotating twin screw extruders such as a 30 mm Leistritz (American Leistritz Extruder Corporation of Somerville, N.J.). Flow rate in the twin screw extruder can be controlled using weight loss feeders such as a K-tron (K-tron America of Pitman, N.J.) to feed the raw material into the extruder. A film die with adjustable slot is used to form a uniform film out of the extruder.

Casting Method

Embodiments of the random microembossed receptor media may also be made using a casting process. A typical casting process comprises the steps of providing a tool having a molding surface having a random pattern inverse of desired microembossed image surface; applying a volume of a flowable resin composition to the molding surface; contacting the resin composition with a first major surface of a film; minimizing excess resin composition between the film and molding surface; curing the resin composition to form a sheeting comprising the microembossed elements bonded to the film; and removing the sheeting from the tool. Further details of the casting method are described in U.S. Pat. Nos. 5,183,597 and 5,304,223, incorporated herein by reference for the casting process, and PCT Patent Publication No. WO 95/11464.

A wide variety of radiation-curable materials are suitable for use in the above method for making the microembossed receptor media of the invention. Examples of such materials are described in U.S. Pat. Nos. 4,576,850 and 4,582,885, both incorporated herein by reference for said materials. The combination of monomers, oligomers, and initiators in order to obtain particular combinations of physical and chemical properties is known to those skilled in the art. Commercial suppliers of such materials include Henkel (Amber, Pa.), Sartomer (Exton, Pa.), UCB (Smyrna, Ga.), and Ciba-Geigy (Hawthorne, N.Y.).

Usefulness of the Invention

Inkjet receptor media of the present invention can be employed in any environment where inkjet images are desired to be precise, stable, rapid drying, and abrasion resistant.

Inkjet receptor media of the present invention can accept a variety of inkjet ink formulations to produce rapid drying and precise inkjet images. The topography of the microembossed image surface of the inkjet receptor medium can be varied for optimum results, depending on several factors, such as: ink droplet volume; ink liquid carrier composition; ink type (pigment or blend of pigment and aqueous or non-aqueous dye); and manufacturing technique (machine speed, resolution, roller configuration); etc.

The imaging surface of the present invention has been found to control dot location to remain within isolated cavities 14 of surface 12 and around posts.

For example, a test pattern of 3 overlapping circles of primary colors (cyan, magenta, yellow), secondary colors (red, green, blue) and tertiary color (black) inkjet ink printed onto an inkjet receptor medium of the present invention shows the precision of color control and pigment location on the medium.

Further, because the pigment particles reside beneath the nominal macroscopic surface of the inkjet receptor medium, the pigment particles are protected from abrasion that does not penetrate as deep as the location of the particles. Incidental abrasion of the graphic during graphic handling after printing is minimized. Moreover, one could use a multilayered microembossed pattern in which the cavity walls and floors are made of substantially different materials, in order to manage coalescence of ink on cavity floors of media of the present invention.

The possibilities of image manipulation on the surface of an inkjet receptor medium, created by the topography of the image surface of that medium, are myriad to those skilled in the art, because the same pattern need not cover the entire surface of the medium. For example, different patterns could be employed, stepwise, in gradation, or randomly across an area of inkjet receptor medium, in order to create structured or unstructured appearances for the images printed thereon.

Another benefit of the media of the present invention is the controlled rate of drying of the ink drop in each cavity. Drying can be measured as the time required before the image becomes tack free or does not smear when lightly rubbed. The use of isolated cavities to minimize migration of color during drying is an advantage in the receptor medium of the invention not previously found in the art.

The formation of precise inkjet images is provided by a variety of commercially available printers. Nonlimiting examples include thermal inkjet printers such as DeskJet brand, PaintJet brand, Deskwriter brand, DesignJet brand, and other printers commercially available from Hewlett-Packard Corporation of Palo Alto, Calif. Also included are piezo type inkjet printers such as those from Seiko-Epson, Raster Graphics, and Xerox, spray jet printers and continuous inkjet printers. Any of these commercially available printers introduces the ink in a jet spray of a specific image into the medium of the present invention. Drying is much more rapid under the present invention than if the imaging layer were to be applied to a similar non-embossed media.

The media of the present invention can be used with a variety of inkjet inks obtainable from a variety of commercial sources. It should be understood that each of these inks has a different formulation, even for different colors within the same ink family. Nonlimiting sources include Minnesota Mining and Manufacturing Company, Encad Corporation, Hewlett-Packard Corporation, NuKote, and the like. These inks are preferably designed to work with the inkjet printers described immediately above and in the background section above, although the specifications of the printers and the inks will have to be reviewed for appropriate drop volumes and dpi in order to further refine the usefulness of the present invention.

Media of the present invention can also be employed with other jettable materials; that is, those materials capable of passing through an inkjet printing head. Nonlimiting examples of jettable materials include adhesives, biological fluids, chemical assay reagents, pharmaceuticals, particulate dispersions, waxes, electrically, thermally, or magnetically modifiable materials, and combinations thereof.

Media of the present invention can also be employed with non-jettable materials so long as an inkjet printing head is not needed to deposit the material on the embossed surface. For example, U.S. Pat. No. 5,658,802 (Hayes et al.) discloses printed arrays for DNA, immunoassay reagents or the like using arrays of electromechanical dispensers to form extremely small drops of fluid and locate them precisely on substrate surfaces in miniature arrays.

The following examples further disclose embodiments of the invention.

General Information

Topography of both microembossed and smooth surfaces were examined by interferometry using a roughness/step tester such as those available from the Veeco Instruments of Plainview, N.Y., or alternatively were examined by scanning electron microscopy or optical microscopy where equipped for depth measurement (z-axis micrometer).

Desktop printers: Hewlett-Packard (HP)855 Cse (dye inks with pigmented black, drop size around 20 pL), using standard media (paper) printing mode at "normal" speed (vs. "better" and "presentation" speeds). HP2000 (dye inks with pigmented black, drop size around 20 pL), using "plain paper" mode at "normal" speed. Tektronix Phaser 300, 300 dpi, plain paper mode.

Wide format printers: Encad NOVAJET 4, Minnesota Mining and Manufacturing Company's pigmented inks (pigment particles 100–200 nm and high surface tension; drop size 140 pL per dot per color), 4-pass mode; and Hewlett-Packard 2500CP, HP pigmented inks (drop size 20 pL), Opaque Vinyl mode, 8 pass mode.

Test patterns: Desktop prints were made using "TEST PATTERN 1", a standard Minnesota Mining and Manufacturing Company print test. This test contains color blocks and color blocks with thin lines intersecting them. Wide format prints were made using "TEST PATTERN 2", a three circle pattern, where overlapping 2 inch diameter circles of cyan, magenta, and yellow create red, blue, green, and black; or "TEST PATTERN 3", a standard test print with color blocks, blocks with intersecting lines, text, grayscale test areas, and other features.

Coating solutions: In some tests, an ink receptive coating was applied to the substrates to facilitate improved print quality or apparent dry time. The coatings were applied from solution using a #3 Mayer rod (a coating rod manufactured by RD Specialties of Webster, N.Y.) or a straight edge, followed by 2 minutes of drying in an 80° C. exhaust oven. One of two coating solutions was used. The first, which will be referred to as Solution 1, comprises the following:

| | |
|---|---|
| $Al_2(SO_4)_3$ | 6 wt. % |
| Dioctyl sulfosuccinate (DOSS) | 7 wt. % |
| SILWET L7607 | 1 wt. % |
| SURFYNOL 204 | 2 wt. % |
| Ethanol | 25 wt. % |
| Water | 59 wt. % |

The second coating, which will be referred to as Solution 2, was prepared by removing the colorless fluid contained in a Canon BC-60 inkjet cartridge (obtained from Canon, Inc. of Ohta-ku, Tokyo) and adding 4 grams of ethanol per 10 grams of the solution in order to facilitate wetting out of the coating onto the substrates.

EXAMPLES

Example 1

Generation of Microembossed Films

Figure 2:
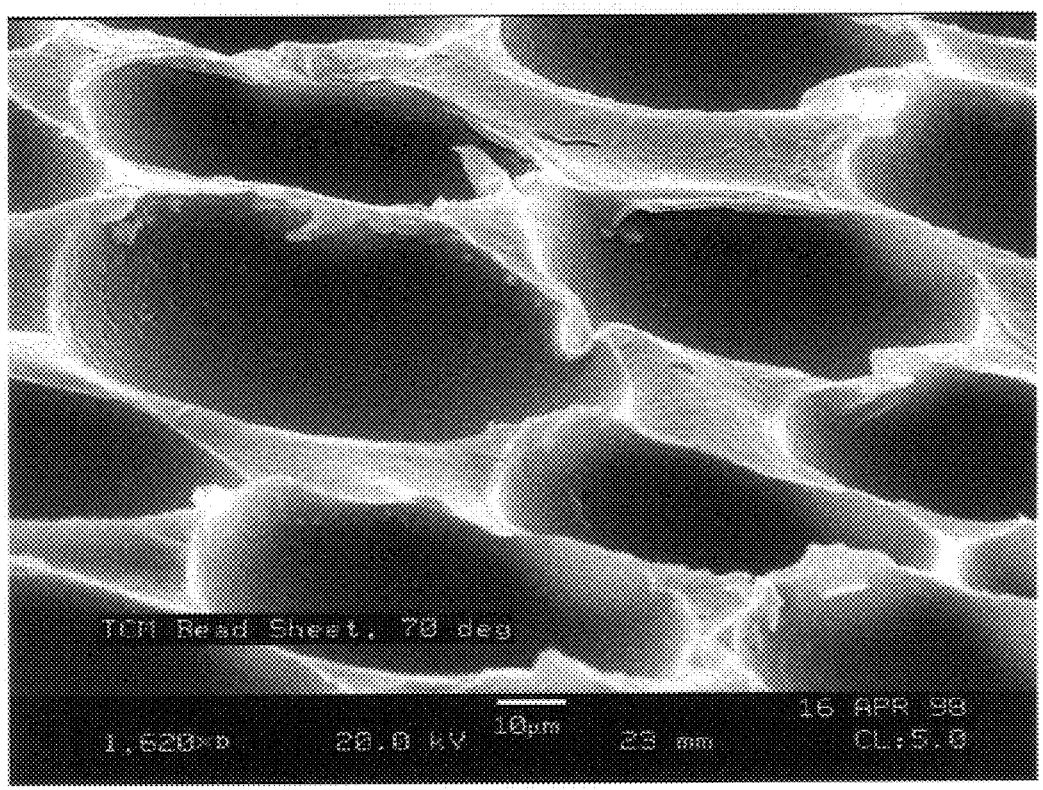
FIGS. 2–15 show various digital images of controls and media of the present invention as imaged.

A polyethylene (PE) layer on paper, "MQ-1" obtained from Felix Schoeller Technical Papers of Germany, was prepared with a random pattern according to the methods outlined in U.S. Pat. No. 4,025,159, incorporated herein by reference. The surface of the PE was thus covered with roughly hemispherical voids 50–85 micrometers in diameter, most lying in the 70–80 micrometer range. The SEM as FIG. 2 illustrates the appearance of the PE film after bead removal. This substrate will be referred to as SUBSTRATE 1 and is seen in FIG. 2.

Some of this material was subsequently flattened by compression molding against a smooth RTV silicone surface. This material will be referred to as CONTROL 1. Samples of SUBSTRATE 1 and CONTROL 1 were printed upon with several printers. SUBSTRATE 1 was also used further to make the same random hemispherical void pattern in other thermoplastics. A piece of SUBSTRATE 1 was used as a template to cast a curable silicone ("SLASTIC J" two part RTV silicone, obtained from Dow Corning Co. of Midland, Mich.) so as to form a crosslinked rubber sheet comprising the inverse topography of the random pattern on SUBSTRATE 1. This crosslinked sheet was then used in compression molding of SURLYN 1705 (ionomer resin, available from DuPont DeNemours and Co.) to form SUBSTRATE 2. A smooth sheet of SURLYN 1705 was used as CONTROL 2.

Example 2

Print Tests of SUBSTRATE 1 and CONTROL 1

Figure 3:
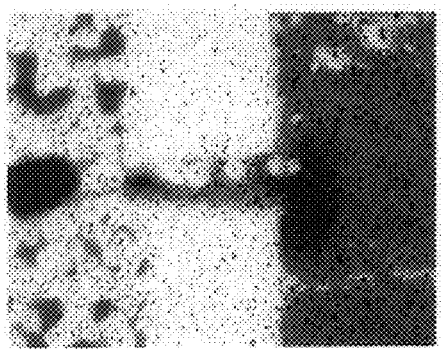
Figure 4:
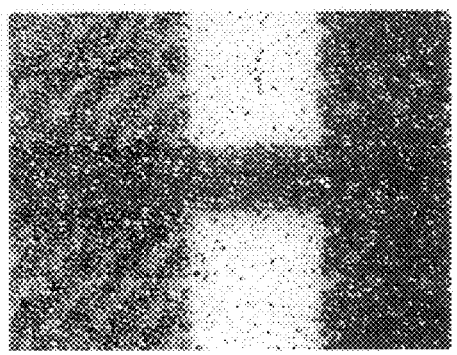

Printer: HP855Cse. Excellent image quality and resolution was observed when TEST PATTERN 1 was printed in plain paper mode at normal speed on SUBSTRATE 1. Qualitative comparison of CONTROL 1 to SUBSTRATE 1, showing the strong effect of print resolution using only the surface pattern (without further coatings, etc.) is exemplified in FIGS. 3 and 4, respectively.

Figure 5:
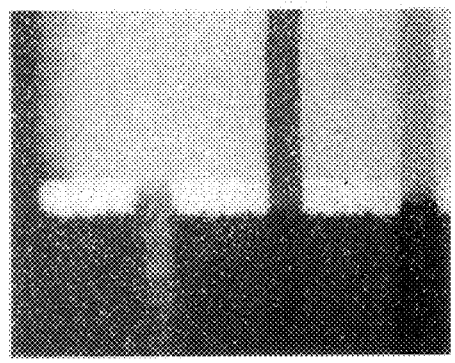
Figure 6:
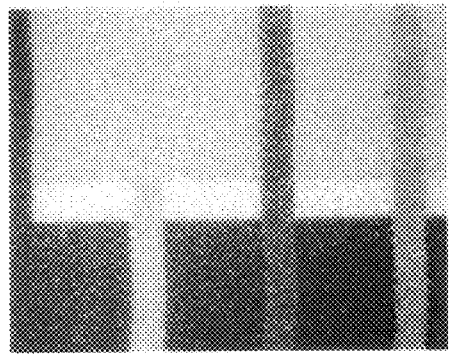

Printer: HP2500CP. This printer, used to print the TEST PATTERN 3 test pattern, caused some ink bleed on SUBSTRATE 1 in areas of high color fill. Also, the dry time in the areas showing ink bleed was poor. Other than this, the quality of the print was very good, with good color density. SOLUTION 1 and SOLUTION 2 were coated onto two samples of SUBSTRATE 1 using a #3 Mayer rod; after drying, the coated substrates were subjected to the same print tests. No ink bleed was observed, and dry times were less than 5 minutes even in the high color fill areas. Also, image density was improved in both the coated samples compared to uncoated Substrate 1. Solution 1 renders the print water-resistant. FIGS. 5 and 6, respectively, illustrate the difference between prints on SUBSTRATE 1 with no coating vs. coating with SOLUTION 2.

Figure 7:
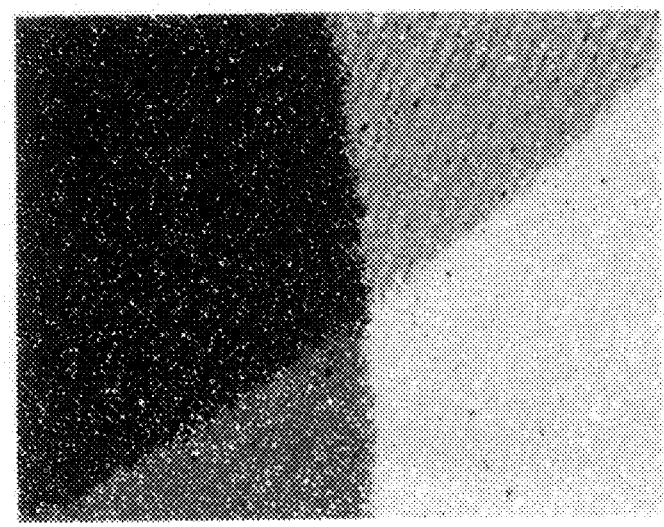

Printer: Encad NOVAJET 4. Prints of TEST PATTERN 2 suffered from the same defects as observed when printing was carried out on the HP2500; that is, ink bleed was observed in high fill areas. A second print test was carried out on SUBSTRATE 1 coated with SOLUTION 1. The resulting resolution and color density were both excellent. FIG. 7 shows this.

Figure 8:
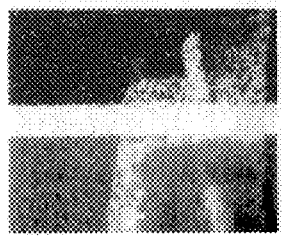
Figure 9:
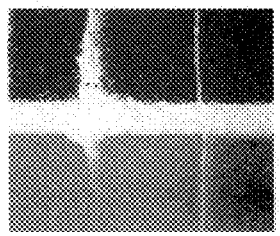
Figure 10:
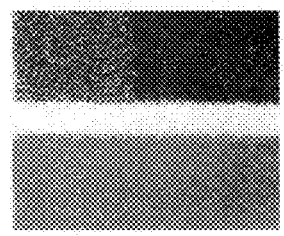

Printer: Tektronix Phaser 300. In this set of print tests, TEST PATTERN 1 was printed on SUBSTRATE 1 (FIG. 10) and CONTROL 1 (FIG. 9) as well as plain paper (FIG. 8). The appearance of all the prints were similar. However, it was observed that for SUBSTRATE 1, the solidified inks were not easily scratched from the surface, and scratch resistance was noticeably improved compared to both CONTROL 1 and paper. To test scratch resistance, a flat piece of aluminum panel ½ inch wide was used to scratch the prints with three passes using reasonable hand pressure. FIG. 10 illustrates the resistance of SUBSTRATE 1 to abrasion.

Printer: Trident Basic PixelJet Evaluation Kit #064-1010-01 from Trident International Inks of Brookfield, CT. This printer was used with non-aqueous, UV curable ink. This example shows how such inks are prevented by substrates of the present invention from unintentional spreading before curing. Print tests were carried out on SUBSTRATE 1 and CONTROL 1. Pigmented black UV curable ink, from Sun Corporation of Fort Lee, N.J., was used to make a test pattern consisting of lines of single drops of ink. The printhead was set to deliver 344×344 dpi of 90 pL drops.

Because with such inks, the ink pigment is dispersed in 100 percent solids UV curable materials, drying in the traditional sense will not occur. Consequently, spreading of the ink can occur between time of contact with the surface and exposure to the UV source. In this experiment, the spreading of a single line of drops was observed over several minutes (until the ink stopped spreading) before curing. The final width of this line was then measured.

Figure 11:
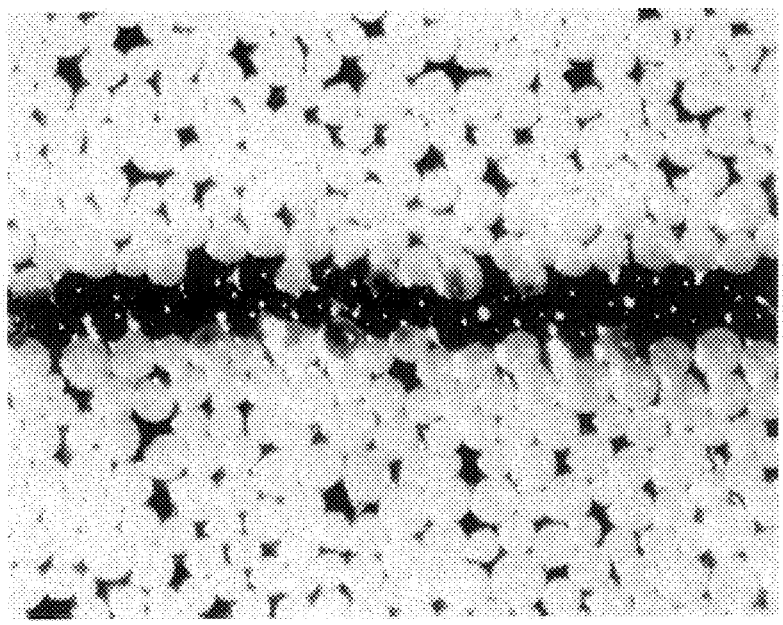
Figure 12:
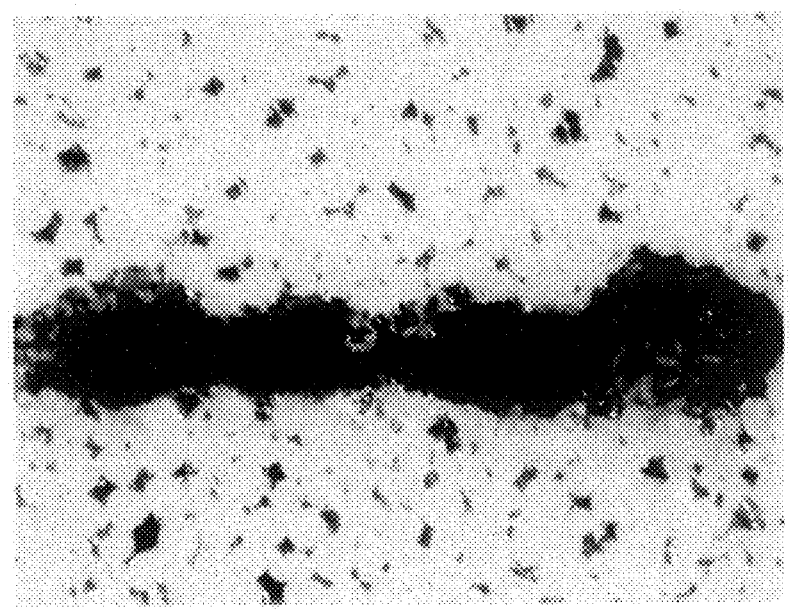

FIGS. 11 and 12, respectively, illustrate the fact that on SUBSTRATE 1 (FIG. 11), line width was restricted relative to CONTROL 1 (FIG. 12). The line width on SUBSTRATE 1 ranged from about 65 to about 125 micrometers (or 1–2 cavities' width). The line width of the same line at the same point in the test print, on CONTROL 1, ranged from 100 to about 250 micrometers. Thus, use of random cavities on the surface of the substrate restricts spreading of the ink.

Example 3

Print Tests on SUBSTRATE 2 and CONTROL 2

Figure 13:
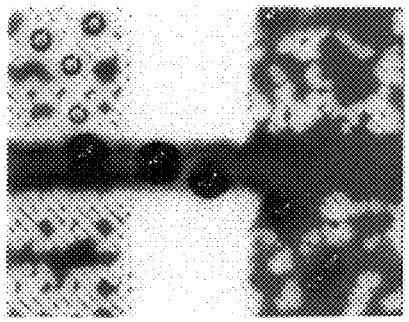
Figure 14:
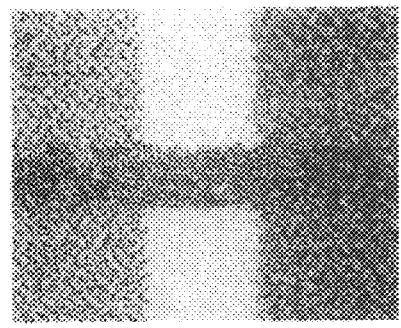

HP2000. SUBSTRATE 2 and CONTROL 2 were used to print TEST PATTERN 1 in plain paper mode/normal quality. FIGS. 13 and 14, respectively, show the difference in the prints obtained. In general, the observations for SUBSTRATE 2 vs. CONTROL 2 were the same as those made for SUBSTRATE 1 vs. CONTROL 1.

Example 4

Generation of SUBSTRATE 3

A holographic diffuser was generated according to U.S. Pat. No. 5,534,386 (Physical Optics Corporation) the disclosure of which is incorporated herein by reference, and a nickel electroform was made. This surface diffuser pattern was replicated using the procedures of U.S. Pat. No. 5,175,030, incorporated herein by reference, and a UV cured resin composed of RDX51027 (UCB of Smyrna, Ga.)/BR-31 (Dia-Ichi Kogyo Sayaku of Kyoto, Japan)/methyl styrene (Sigma-Aldrich of Milwaukee, Wis.)/phenoxyethyl acrylate (Henkel of Ambler, Pa.)/EBECRYL 220 (UCB)/FC 430 (Minnesota Mining and Manufacturing Company)/ LUCERIN TPO (BASF of Wyandotte, Minn.) in the ratio of 55/22/11/6.5/5.5/0.3/3), and using MELINEX 617 (ICI of Wilmington, Del.) polyester as substrate.

Example 5

Print Tests on SUBSTRATE 3

HP855Cse, HP2500CP. SUBSTRATE 3 allowed for greater movement of wet ink than SUBSTRATE 1 or SUBSTRATE 2. This problem was most noticeable when the HP2500CP was used to make the TEST PATTERN 2 pattern, probably due to the larger total volume of ink per dot delivered from the wide format printer.

Figure 15:
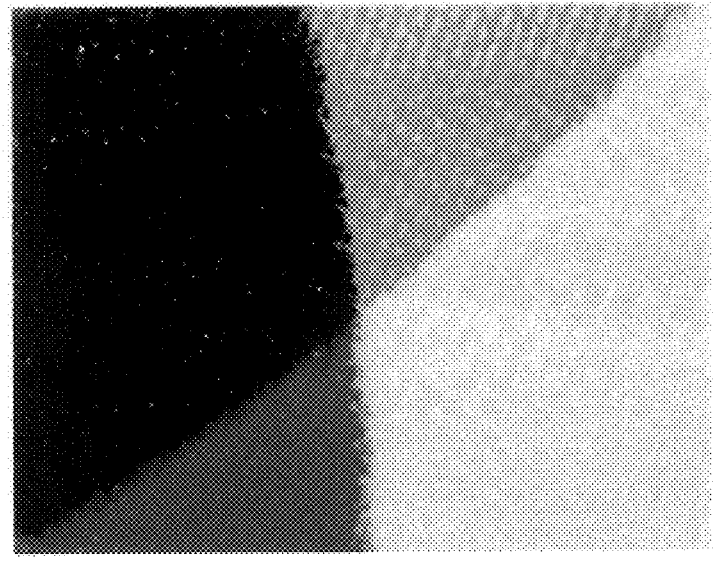

However, when SOLUTION 1 was added, SUBSTRATE 3 exhibited outstanding appearance. The colors were extremely intense. The backlit properties of the print were also excellent. Intense color was seen both from the back and front of the substrate, as the sample became quite transparent where the ink was deposited. FIG. 15 shows some aspects of the appearance of the test print.

Example 6

This example shows the advantages that can be achieved through embossing films with a well pattern with a random distribution of walls of varying height. A precision diamond turning machine (as described in "Manufacturers Turn Precision Optics with Diamond", by E. Ray McClure, Laser Focus World, February 1991, pp. 95–105) was used to cut a grid of grooves with nearly rectangular cross-section into a copper Ballard shell. A series of parallel grooves was cut such that the distance between each pair of adjacent grooves was 154.46 micrometers and the depth of the grooves was either 26 micrometers or 9 micrometers, depending on an algorithm based on the depths of the preceding grooves. The specific probabilities used in the algorithm are shown in Table 1.

TABLE 1

Probabilities used in the algorithm.

| Wall (I-2) | X | X | X | Deep | Shallow |
|---|---|---|---|---|---|
| Wall (I-1) | Deep | Shallow | Deep | Shallow | Shallow |
| Wall (I) | Deep | Deep | Shallow | Shallow | Shallow |
| P % (Shallow) | 100% | 75% | 50% | 25% | 0% |

The probability of cutting a shallow wall, P %(Shallow) is determined by the depths of up to the three preceding grooves, Wall (Index).

To create a rectangular pattern, additional grooves were cut in a direction perpendicular to the first series using the same probabilities used in the algorithms described in Table 1.

After all of the grooves were cut, the copper roll was plated with a thin layer of Ni and the microembossed portion of the roll was removed from the roll so that it could be used as a compression molding tool. A Lexan Polycarbonate (available from the General Electric Company, Pittsfield, Ma.) replica of the diamond-turned tool was made in a hot press.

The following examples demonstrate the use of several randomly microembossed inkjet receptors.

Example 7

A 20 percent solids solution containing by weight 85 percent of a 70:30 blend of polyvinylpyrrolidone (PVP K90, available from ISP) and poly(ethylene-co-acrylic acid) (available as an aqueous dispersion (Michem Prime 4983R) from Michelman) and 15 percent Pycal 94 (available from ICI surfactants, Wilmington, Del.) was prepared. This ink receptor composition was coated at approximately 5.7 mils wet thickness onto 3.88 mil PET (polyethylene terephthalate) film primed with PVDC (polyvinylidene chloride) and dried to give a clear film with a dry coating thickness of approximately 29 micrometers. This film was subsequently coated with a 3 percent solids solution containing a 1:1 blend of Methocel K-35 (available from Dow Chemical Company) and Alumina (available as an aqueous dispersion (Dispal 23N4-20) from the Condea Vista Chemical Co.). The resulting dry thickness of this coating was approximately 1 micrometer. The coated surface of this film was microembossed by pressing it against a nickel plated copper tool in a compression molding apparatus (Wabash Model 20-122TM2WCB, available from Wabash MPI of Wabash, Ind.). The platen temperatures were 67° C. and a pressure of 4.3 Mpa was applied for 12 minutes.

The nickel plated copper microembossing tool used in this example contained two orthogonal series of grooves. In each series, the distance between adjacent grooves was about 154 micrometers, and the depth of the grooves was either 26 micrometers or 9 micrometers based on a mathematical algorithm dependent on the depths of the preceding grooves. The specific probabilities used in the algorithm are shown in Table 2.

TABLE 2

Probabilities used to determine groove depth.

| Wall (I-2) | X | X | X | Tall | Small |
|---|---|---|---|---|---|
| Wall (I-1) | Tall | Small | Tall | Small | Small |
| Wall (I) | Tall | Tall | Small | Small | Small |
| P % (Small) | 100% | 75% | 50% | 25% | 0% |

As shown in the table, the probability of cutting a shallow groove, P %(Small), is determined by the depths of up to three preceding grooves, Wall (Index). The shallow grooves were about 9 micrometers wide at the bottom and about 12 micrometers wide at the top. The deep grooves were about 9 micrometers wide at the bottom and 14 micrometers wide at the top.

The microembossed surface of this film was imaged with a Hewlett-Packard (HP) 890C inkjet printer equipped with aqueous inks. Settings of the 890C printer were "transparency mode", "best quality", with color settings "automatic". The image densities of both the primary and secondary colors were measured using a Macbeth TR-924 transmission reflection densitometer (available from Gretag MacBeth Company of New Windsor, N.Y.) in the reflection mode using Status A filters. The data are shown in Table 3 where "C", "M", "Y", and "K" represent cyan, magenta, yellow, and black densities, respectively.

Example 8

An additional sample of the coated PET film whose preparation is described in Example 7 was microembossed by pressing its coated surface against a nickel plated copper tool in a compression molding apparatus (Wabash Model 20-122TM2WCB, available from Wabash MPI of Wabash, Ind.). The platen temperatures were 65° C. and a pressure of about 4.3 Mpa was applied for about 12 minutes.

The nickel plated copper microembossing tool used in this example contained two orthogonal series of grooves. In each series, the primary grooves are 26 micrometers deep and the remainder are 9 micrometers deep. The center-to-center distance between adjacent deep grooves varies in an irregular way between a lower limit of about 270 micrometers and an upper limit of about 470 micrometers. Over the entire series, the distribution in the deep groove spacing is characterized very well by a nearly uniform probability distribution. The deep grooves were about 9 micrometers wide at the bottom and 14 micrometers wide at the top. Between each of the deep grooves, there exist a number of shallow (9 micrometer depth) grooves. For deep grooves spaced less than 370 micrometer apart, there is one shallow groove at the midpoint between the two surrounding deep grooves. For deep grooves spaced more than 370 micrometers apart, there are two shallow (9 micrometer depth) grooves which equally subdivide the space between the deep grooves. The shallow grooves were about 9 micrometers wide at the bottom and about 12 micrometers wide at the top.

The microembossed surface of this film was imaged and analyzed using the procedure described in Example 7. The data are shown in Table 3.

Example 9

An additional sample of the coated PET film whose preparation is described in Example 7 was microembossed by pressing its coated surface against a nickel plated copper tool in a compression molding apparatus (Wabash Model 20-122TM2WCB, available from Wabash MPI of Wabash, Ind.). The platen temperatures were 67° C. and a pressure of about 4.3 Mpa was applied for about 11 minutes.

The nickel plated copper microembossing tool used in this example contained two orthogonal series of grooves. In each series, the primary grooves are 26 micrometers deep and the remainder are 9 micrometers deep. The center-to-center distance between adjacent deep grooves varies in an irregular way between a lower limit of about 370 micrometers and an upper limit of 470 micrometers. Over the entire series, the distribution in the deep groove spacing is characterized very well by a nearly uniform probability distribution. The deep grooves were about 9 micrometers wide at the bottom and 14 micrometers wide at the top. Between each of the deep grooves, there exist two shallow (9 micrometer depth) grooves that equally subdivide the space between the two deep grooves. The shallow grooves were about 9 micrometers wide at the bottom and about 12 micrometers wide at the top.

The microembossed surface of this film was imaged and analyzed using the procedure described in Example 7. The data are shown in Table 3.

TABLE 3

|  |  | C | M | Y | R | G | B | K (grf) |
|---|---|---|---|---|---|---|---|---|
| Example 7 | 890C | 1.30 | 1.14 | .87 | 1.05, .79 | .88, .69 | 1.23, .58 | 1.81 |
| Example 8 | 890C | 1.36 | .99 | .89 | 1.09, .82 | .90, .70 | 1.25, .57 | 1.82 |
| Example 9 | 890C | 1.29 | 1.16 | .87 | 1.04, .80 | .86, .68 | 1.17, .56 | 1.75 |

Example 10

A mold was prepared by drilling holes in a 125 μm thick polyimide (Kapton™ H from DuPont DeNemours and Co.) sheet using an excimer laser operating at 248 nm. The holes were about 50 μm in diameter and about 75 μm deep. The placement of the holes was randomized such that there were 4.65 holes/mm$^2$ on average and there was no circular area on the sheet having a diameter greater that 0.85 mm that did not have a hole on it.

The above polyimide sheet was then used as a mold in a compression molding machine to microemboss a polycarbonate sheet (0.254 millimeters thick (available from the General Electric Co., Pittsfield, Ma.) with a post pattern. The temperature of the platens was 190° C. and a pressure of about 0.8 MPa was applied for about two minutes, followed by an additional two minutes at a pressure of about 1.6 MPa. This pressure was applied for an additional 5–10 minutes while the platens were cooled to about 100° C. The platens were then opened and the microembossed polycarbonate film was removed from the polyimide sheet.

SILASTIC J (a trade designation for a RTV silicone elastomer, available from Dow Coming Co.) was then cast onto the microembossed polycarbonate sheet and cured in a convection oven at 70° C. for one hour while it still covered the microembossed polycarbonate sheet to produce a microembossing tool containing a random arrangement of holes.

To prepare an ink receptive sheet, a 14 percent solids solution containing by weight 85 percent of a 70:30 blend of polyvinylpyrrolidone (PVP K90, available from ISP Technologies, Wayne, N.J.) and poly(ethylene-co-acrylic acid) (available as an aqueous dispersion (Michem Prime 4983R) from Michelman Inc., Cincinnati, Ohio) and 15 percent Pycal 94 (available from ICI surfactants, Wilmington, Del.) was coated at approximately 0.380 millimeters wet thickness onto 98 micrometers thick PET (polyethylene terephthalate) film primed with PVDC (polyvinylidene chloride) (available from the Minnesota Mining and Manufacturing Company) and dried in a single zone oven system at 140° C., to give a clear film with a dry coating thickness of approximately 53 micrometers.

The microembossed surface of the SILASTIC J microembossing tool was then pressed into the coated side of the ink receptive sheet in a compression molding apparatus. The temperature of the platens was 170° C. and a pressure of about 1.6 MPa was applied for about five minutes. The pressure was applied for an additional 5–10 minutes while the platens were cooled to about 100° C. The platens were then opened and the microembossed ink receptive film was removed from the microembossing tool.

The microembossed surface of a commercial, nominally planar inkjet receptor film, CG3460, obtained from Minnesota Mining and Manufacturing Company, was imaged and analyzed using the procedure described in Example 7 using the printers and printer settings below:

Hewlett-Packard HP 890C, transparency mode, best quality, color automatic.

Hewlett-Packard HP 2000C, rapid dry transparency mode, best quality, color automatic.

The data are shown in Table 4 below where "C", "M", "Y", "R", "G", "B", and "K" represent cyan, magenta, yellow, red, green, blue, and black densities, respectively.

TABLE 4

|  | C | M | Y | R | G | B | K |
|---|---|---|---|---|---|---|---|
| 890C |  |  |  |  |  |  |  |
| Example 10 | 1.52 | 1.41 | 0.95 | 1.19, 0.82 | 1.06, 0.71 | 1.50, 0.60 | 1.65 |
| 3M3420 | 1.59 | 1.47 | 0.88 | 1.12, 0.85 | 1.04, 0.68 | 1.44, 0.62 | 1.68 |
| 2000C |  |  |  |  |  |  |  |
| Example 10 | 2.10 | 1.07 | 1.91 | 1.02, 1.85 | 1.20, 1.52 | 1.37, 0.61 | 1.67 |
| 3M3420 | 2.37 | 1.15 | 1.80 | 1.01, 1.96 | 1.37, 1.56 | 1.54, 0.68 | 2.52 |

An indication of ink dry times was measured in the following manner: Xerographic bond paper was placed on the imaged area 30 seconds after printing and rolled with a 5 pound roller. Table 5 below shows reflective image densities measured off the paper from transferred ink.

TABLE 5

|  | C | M | R | G | B | K (one color) | K (all colors) |
|---|---|---|---|---|---|---|---|
| 890C |  |  |  |  |  |  |  |
| Example 10 | 0 | 0 | 0.02, 0.01 | 0 | 0 | 0.08, | 0.03 |
| 3M3420 | 0.01 | 0.02 | 0.05, 0.01 | 0.02, 0 | 0.02, 0.01 | 0.28 | 0.06 |
| 2000C |  |  |  |  |  |  |  |
| Example 10 | 0.04 | 0 | 0 | 0.09, 0.12 | 0.05, 0.04 | 0.25 | 0.03 |
| 3M3420 | 0.13 | 0.06 | 0.10 | 0.08, 0.13 | 0.09, 0.09 | 0.76 | 0.08 |

The lower the number in Table 5, the shorter the dry time. Thus, it is clear that the microembossed surface of the receptor medium of Example 10 gives significantly shorter dry times compared to a commercial inkjet receptor medium.

Example 11

A UV curable resin was prepared by adding 5 grams of hydroxyethyl acrylate (Aldrich Chemical, Milwaukee, Wis.), 0.15 gram of SR610 (Sartomer Company, Exton, Pa.), 0.19 gram of SR9035 (Sartomer Company, Exton, Pa.), and 0.16 gram of Darocur 1173 (Ciba Specialty Chemicals, Tarrytown, N.Y.) to 10 grams of a 50/50 solution of 10 k molecular weight polyvinylpyrrolidone (Aldrich Chemical, Milwaukee, Wis.) and N-vinyl-2-pyrrolidone (Aldrich Chemical, Milwaukee, Wis.). A microembossed tool was coated with the UV curable resin and a piece of MELINEX 617 (ICI, Wilmington, Del.) was laminated onto the resin coated tool using a hand ink roller to minimize the coating thickness. The resin was cured by irradiation through the MELINEX using a MetalBox medium pressure mercury lamp on its high setting at a speed of 11.3 m/min. After removing the cured resin/MELINEX film composite from the tool, the microembossed side was irradiated at 11.3 m/min beneath the mercury lamp.

The microembossed tool used in this example was made of RTV silicone ("SILASTIC J" two part RTV silicone, obtained from Dow Corning Co.) and contained two orthogonal series of grooves. In each series, the primary grooves are 26 micrometers deep and the remainder are nine micrometers deep. The center-to-center distance between adjacent deep grooves varies in an irregular way between a lower limit of about 270 micrometers and an upper limit of about 470 micrometers. Over the entire series, the distribution in the deep groove spacing is characterized very well by a nearly uniform probability distribution. The deep grooves were about 9 micrometers wide at the bottom and 14 micrometers wide at the top. Between each of the deep grooves, there exist a number of shallow (9 micrometer depth) grooves. For deep grooves spaced less than 370 micrometers apart, there is one shallow groove at the midpoint between the two surrounding deep grooves. For deep grooves spaced more than 370 micrometers apart, there are two shallow (9 micrometer depth) grooves which equally subdivide the space between the deep grooves. The shallow grooves were about 9 micrometers wide at the bottom and about 12 micrometers wide at the top.

A smooth resin-coated control was also produced using a knotch-bar coater set to make a 1.5 mil thick coating. The UV curable resin was cast between a sheet of plain 5 mil PET film (Minnesota Mining and Manufacturing Company) and a sheet of MELINEX 617. The resin was cured by irradiation through the MELINEX using a MetalBox medium pressure mercury lamp on its high setting at a speed of 11.3 m/min. The plain PET was then separated leaving the MELINEX film with a smooth resin coating.

The microembossed film and the smooth sample were printed with cyan, magenta, yellow, red, green, blue, and black color blocks on a Hewlett-Packard HP2500 desktop printer using "HP premium transparency" mode, "best" quality, and "automatic" color settings with the standard inks supplied by Hewlett-Packard Corporation. The printed microembossed film looked sharp and uniform while the smooth sample looked mottled and non-uniform. The dry time was measured by placing a piece of paper over the print 30 seconds after the print was removed from the printer and rolling with a roller. The reflective image densities were then read using a Gretag SPM55 densitometer. These results are shown in Table 6 below.

TABLE 6

Drytime: Reflective Print Density Measured 30 Seconds After Imaging

|  |  |  |  | Red | | Green | | | | |
|---|---|---|---|---|---|---|---|---|---|---|
| Sample | Cyan | Mag | Yel | M | Y | C | Y | M | C | Black |
| Random Radiation Cured Receptor | 0.32 | 0.20 | 0.16 | 0.29 | 0.27 | 0.23 | 0.18 | 0.22 | 0.36 | 0.04 |
| Control: smooth coating | 0.41 | 0.32 | 0.22 | 0.41 | 0.36 | 0.38 | 0.27 | 0.49 | 0.68 | 0.26 |

The invention is not limited to the above embodiments. The claims follow.

What is claimed is:

1. An inkjet printing medium comprising a polymeric sheet having a random, microembossed surface topography comprising cavities on one major surface thereof wherein the cavities are hemispherical, conical, truncated pyramidal, cube-corner shaped, or combinations thereof, wherein each cavity has a capacity of at least 10 pL and an aspect ratio of from 0.05 to 2, wherein the sheet is nonporous, and wherein a jettable material is deposited on the microembossed surface.

2. The inkjet printing medium of claim 1, wherein cavities are enclosed by walls having wall tops, wherein the wall tops have a thickness of 10 micrometers or less.

3. The inkjet printing medium of claim 1, wherein the random microembossed surface topography comprises a random collection of cavities wherein volume of any one cavity is sufficient enough to anticipate placement of at least two drops of ink.

4. The inkjet printing medium of claim 1, wherein the capacity is for at least three drops of ink.

5. The inkjet printing medium of claim 1, wherein the volume of a cavity is at least about 20 pL.

6. The inkjet printing medium of claim 1, wherein the volume of a cavity is at least about 60 pL.

7. The inkjet printing medium of claim 1, wherein the sheet is opaque, optically reflective, optically retroreflective, or combinations thereof.

8. The inkjet printing medium of claim 1, wherein the random microembossed surface topography is made of a microembossed thermoplastic.

9. The inkjet printing medium of claim 8, wherein the sheet is a polymeric film selected from the group consisting of polyolefins, poly(vinyl chloride), copolymers of ethylene with vinyl acetate or vinyl alcohol, copolymers and terpolymers of hexafluoropropylene and surface modified versions thereof, poly(ethylene terephthalate) and copolymers thereof, polycarbonate, norbornene polymers and copolymers, polyurethanes, polyimides, acrylics, and filled versions thereof, wherein the filled versions employ fillers selected from the group consisting of silicates, aluminates, feldspar, talc, calcium carbonate, and titanium dioxide.

10. The inkjet printing medium of claim 1, wherein the random microembossed surface topography is made of a microembossed cured radiation-curable material.

11. The inkjet printing medium of claim 1, wherein the sheet comprises two or more layers. on a major surface opposite the microembossed surface.

12. The inkjet printing medium of claim 1, further comprising an adhesive layer on a major surface opposite the microembossed surface.

13. The inkjet printing medium of claim 12, further comprising a release liner protecting the adhesive layer.

14. The inkjet printing medium of claim 1, wherein the jettable material is a dye based ink.

15. The inkjet printing medium of claim 1, wherein the jettable material is a pigmented ink.

16. The inkjet printing medium of claim 1, wherein the jettable materials is selected from the group consisting of inks, adhesives, biological fluids, pharmaceuticals, chemical assay reagents, particulates dispersions, waxes, electrically, thermally, or magnetically modifiable materials, and combinations thereof.

* * * * *

UNITED STATES PATENT AND TRADEMARK OFFICE
CERTIFICATE OF CORRECTION

PATENT NO. : 6,649,249 B1
DATED : November 18, 2003
INVENTOR(S) : Engle, Lori P. et al.

It is certified that error appears in the above-identified patent and that said Letters Patent is hereby corrected as shown below:

Column 2,
Line 33, delete "-".

Column 4,
Line 28, delete "-".

Column 5,
Lines 7 and 55, delete ",".

Column 7,
Line 4, after "50" insert -- . --.

Column 9,
Line 18, delete "SLWET" and insert in place thereof -- SILWET --.

Column 14,
Line 53, delete "SLASTIC" and insert in place thereof -- SILASTIC --.

Column 16,
Line 29, delete "Minn." and insert in place thereof -- Mich. --.

Column 19,
Line 28, delete "that" and insert in place thereof -- than --.
Line 42, delete "Coming" and insert in place thereof -- Corning --.

Column 22,
Table 6, after heading "Green", insert heading -- Blue --.

UNITED STATES PATENT AND TRADEMARK OFFICE
CERTIFICATE OF CORRECTION

PATENT NO. : 6,649,249 B1
DATED : November 18, 2003
INVENTOR(S) : Engle, Lori P. et al.

It is certified that error appears in the above-identified patent and that said Letters Patent is hereby corrected as shown below:

Column 24,
Lines 14-15, delete "on a major surface opposite the microembossed surface".
Line 26, delete "materials" and insert in place thereof -- material --.
Line 28, delete "particulates" and insert in place thereof -- particulate --.

Signed and Sealed this

Twenty-seventh Day of September, 2005

JON W. DUDAS
*Director of the United States Patent and Trademark Office*